Figure 1:
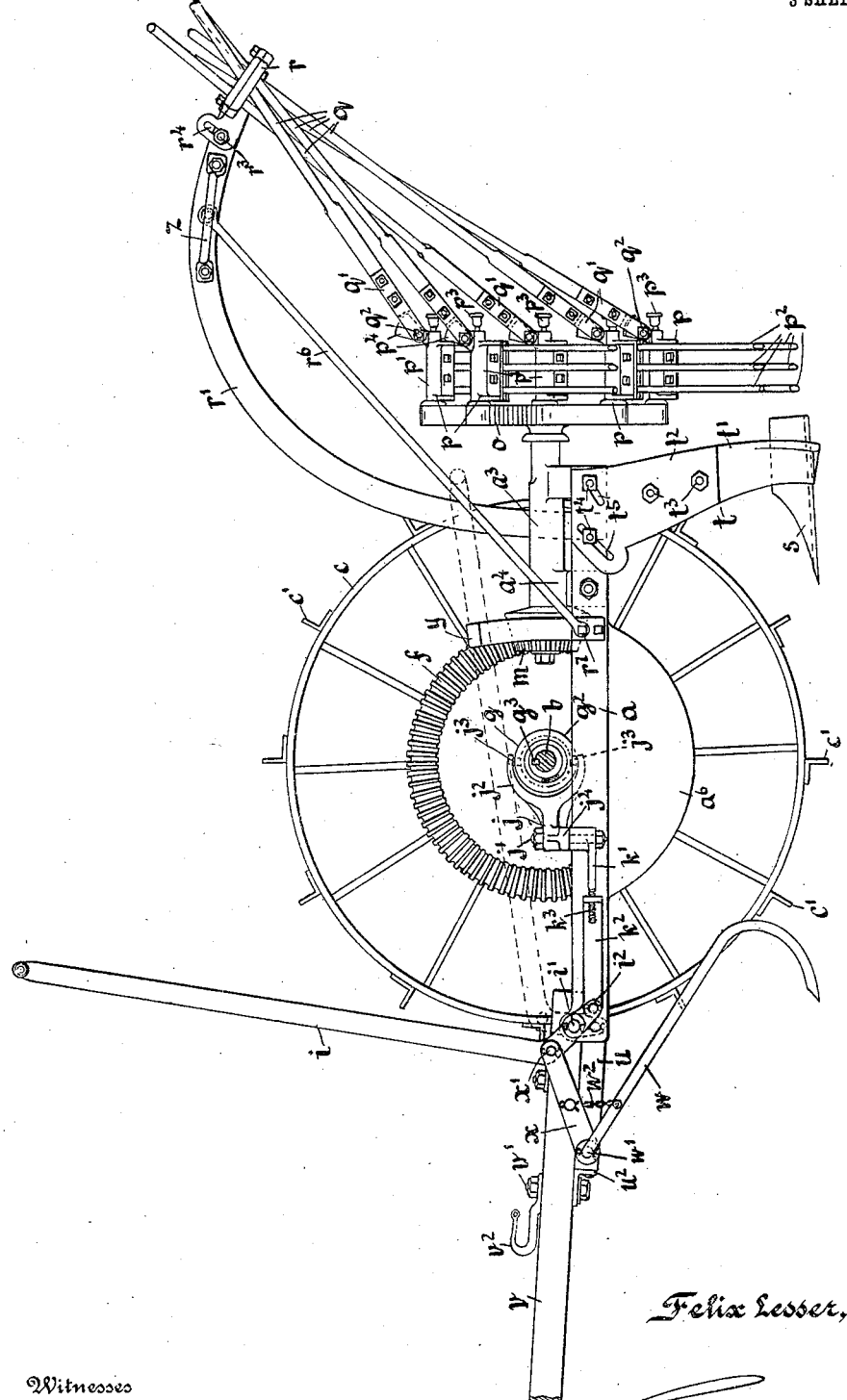

UNITED STATES PATENT OFFICE.

FELIX LESSER, OF WAUKESHA, WISCONSIN, ASSIGNOR, BY MESNE ASSIGNMENTS, TO STEVENS MANUFACTURING COMPANY, A CORPORATION OF WISCONSIN.

POTATO-DIGGER.

935,209. Specification of Letters Patent. Patented Sept. 28, 1909.

Application filed August 4, 1908. Serial No. 446,915.

*To all whom it may concern:*

Be it known that I, FELIX LESSER, of Waukesha, Wisconsin, have invented a Potato-Digger, of which the following is a specification.

The object of this invention is to produce a machine for effectively extracting potatoes from the ground with a minimum expenditure of time and labor and a maximum of efficiency. More particularly, I aim to produce a machine which shall extract a larger percentage of potatoes than previous machines, completely free them from associated earth, stones, vines and weeds, and deliver them to a point where they cannot become buried or hidden by the latter. I also aim to produce an effective machine which can be drawn by two horses without overloading and which will operate substantially in all kinds of soil.

My invention comprises in its essentials a wheeled frame provided with a plurality of digger-forks which are arranged to move transversely to the direction of movement of the machine, that is, transversely to the potato row, entering the earth at one side of the row and leaving it at the other. In advance of the digger-forks is arranged a scoop-shaped share which loosens the earth so as to permit the forks to readily pass through it. The action of the forks is to dig out the potatoes and throw them on one side of the row where they cannot become hidden by loose earth. I also provide a weed-hook in advance of aforesaid share for combing out the vines whereby they are prevented from entangling the operating parts and preventing their proper operation.

The essential feature of my present invention consists in the motion given to the forks, which while they are in the ground retain their vertical positions, and thereby are prevented from throwing the potatoes to a distance as well as from injuring the potatoes by striking them too violently and from driving them into the earth at the first descent of the fork into the ground.

It will be understood that as the forks during the active part of the cycle move always in a substantially vertical position, they exercise no lifting action upon the potatoes more than necessary to extract them from the ground, and, as their horizontal movement slackens upon their emergence from the ground, therefore the potatoes as fast as they are extracted are simply dropped at one side of the row, no material horizontal throwing action being exerted upon them.

In the specific form of my invention herein claimed, a further great advantage is gained by the fact that they are self-cleaning from weeds, vines etc., and that it is impossible for the latter to become tangled around them and around the shaft. This is so because, as the forks stand always vertical, they easily drop off therefrom by their own weight or are shaken off therefrom by the machine, and even if any should stick on any fork, they will be detached by the brushing of the vines over the hub of the next succeeding fork.

Another feature of my invention consists in the mounting of the scoop or share which runs immediately in front of the plane of action of the forks, so that it will be adjustable independently of the frame to different angles with the vertical so as to plow to a greater or less depth in the earth.

My invention also comprises certain combinations and constructions which will be hereinafter described and particularly set forth in my claims.

My invention may best be understood by reference to the accompanying drawings taken in connection with the following description thereof.

Figure 2:
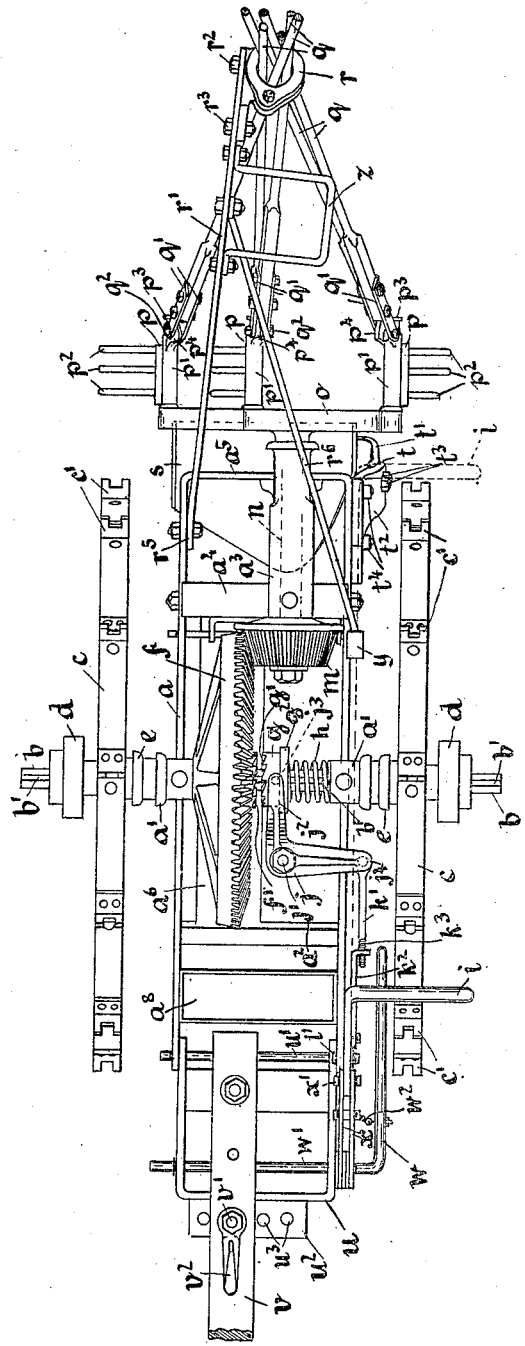
Figure 3:
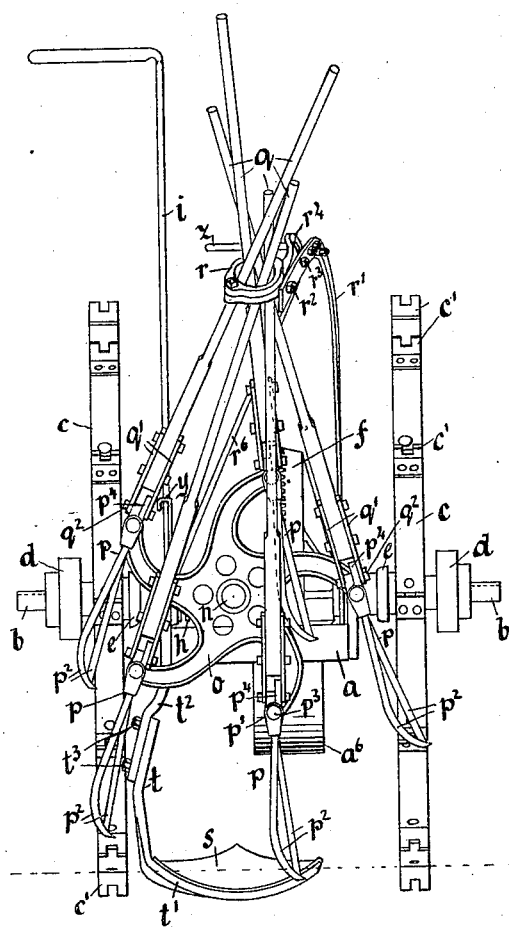

In these drawings, Figure 1 is a side elevation of a complete machine from the left side, the left wheel and shaft-bearing being removed; Fig. 2 is a plan view thereof; Fig. 3 is a rear-end view thereof.

In these drawings, every reference letter and numeral refers always to the same part.

The machine comprises a frame $a$, which as here shown is substantially a piece of flat bar steel bent into three sides of a rectangle, and which is suspended by bearings $a'$ upon a shaft $b$, whereon are mounted the supporting and driving-wheels $c$. The shaft $b$ is provided with key-ways $b'$ on its ends and middle portion and is operatively connected with the wheels $c$ by means of ratchet-clutches $d$ such as are commonly used in agricultural machines for connecting the wheels with the axle to compensate differences in velocity between the two wheels. The wheels are shown as provided with projecting flanges $c'$ at intervals, which prevent the wheels from slipping on the ground, but these are not an essential part of my invention. Spacing-pieces $e$ of different length and number are inserted between the wheels $c$ and bearings $a'$ to accommodate the distance between the wheels to different spacings of the potato rows. The shaft $b$ has mounted thereon adjacent to the right-hand bearing $a'$ a beveled gear $f$, which is loose upon the shaft, and is driven therefrom during operation of the machine by means of a clutch $g$, which has crown-teeth $g'$ engaging with similar teeth $f'$ on the hub of the gear $f$; said clutch $g'$ is nonrotatably connected with the shaft by a spline $g^3$ sliding in the keyway $b'$ and is pressed resiliently against teeth $f'$ by a spring $h$ abutting upon the opposite bearing $a'$; so that the teeth $f'$ and $g'$ are held normally in engagement. When the machine is being drawn inoperatively, however, the clutch $g$ is withdrawn from the gear $f$ by means of a hand-lever $i$ which is pivoted on a pin $i'$ at the front end of the frame and operates also other parts of the machine as will be described hereinafter. Said lever $i$ operates to withdraw the clutch $g$ from the gear $f$ by the following mechanism, to wit: a bell-crank lever $j$, pivoted upon a pin $j'$ on the bottom-plate $a^2$ of the frame $a$; said lever having a forked arm $j^2$, the branches of which extend on opposite sides of the clutch $g$ and are each provided with a pin $j^3$ engaging a collar $g^2$ on the clutch $g$; and a link composed of the two elements $k'$ and $k^2$ adjustably connected by a screw-thread $k^3$, and uniting the short arm $i^2$ of the lever $i$ with the transverse arm $j^4$ of the lever $j$ by appropriate pivot connections, as shown.

With the gear $f$ meshes a beveled pinion $m$ mounted on a shaft $n$ in a supporting-sleeve or bearing $a^3$ which is mounted on the frame, the front end being supported by a transverse bridge $a^4$ and the rear end upon the rear transverse member $a^5$ of the frame. On the rear end of the shaft $n$ is mounted a star-wheel $o$, on the arms of which are rotatably mounted the digger-forks $p$, each of said forks having a hub $p'$ turning on a pin or stub-shaft mounted on the end of the arm and being provided with three removable tines or prongs $p^2$. In some cases only two of these prongs will be required and the third may be removed, but this is not of the essence of my invention. The ends of the hubs $p'$ may be closed by grease-cups $p^3$.

Now it is of the essence of my invention that the digger-forks should not be fixed to the wheel $o$ so as to rotate therewith, as I have found that when so mounted they do not operate satisfactorily, and I therefore arrange some means for holding them against rotation, whereby their motion, at least on the lower side of the star-wheel, is substantially one of translation without rotation, in order to cause forks to enter, pass through, and leave the ground in a substantially vertical position. According to this construction, each digger-fork has pivotally mounted thereon a sliding-stick $q$, said stick being provided on its end with a pair of flange-plates $q'$ which turn upon a pin $q^2$ passing through a flange-lug $p^4$ projecting from the upper side of each hub $p'$, which flange-lug lies between the plates $q'$ and acts in connection with them to prevent the hub from turning transversely to the stick $q$. The ends of all the sticks $q$ are gathered together and received in a ring $r$, which is mounted on the end of a bracket $r'$ extending above and to the rear of the digger-forks; so that as the wheel $o$ rotates, said sticks $q$ reciprocate within the ring $r$ and also move consecutively around the circumference of the ring. The angle of the ring $r$ may be adjusted by turning it upon a pivot-bolt $r^2$, and secured in position by a second bolt $r^3$ passing through an arc-shaped slot $r^4$. The lower end of the arm $r'$ is secured to the frame at $r^5$ and is braced transversely by a rod $r^6$ secured to the opposite side of the frame at $r^7$.

Immediately in advance of the digger-forks is arranged a scoop-shaped share $s$ which is mounted on a sheth $t$ made in two parts $t'$ and $t^2$ secured together by bolts $t^3$ and adjustably mounted upon the frame by bolts $t^4$ passing through slots $t^5$. The share $s$ passes through the earth beneath the potatoes and throws up the earth and potatoes contained therein into loose condition for the action of the digger-forks $p$. By means of the adjusting slots $t^5$ I am enabled to tilt the share $s$ to different angles with relation to the frame $a$ independently of the action of the lever $i$, and thus to break up the ground to a greater or less depth in accordance with existing circumstances.

At the front of the frame $a$ is mounted a three-sided extension $u$ thereof, pivoted upon a bolt $u'$ connecting the two ends of the frame, and the draft-pole $v$ is adjustably mounted upon the extension $u$, an angle-piece $u^2$ containing a plurality of bolt-holes $u^3$ being provided for the adjustable mounting of the pole; the bolt $v'$, on which the draft-hook $v^2$, is mounted, passing through one of said holes. On the extension $u$ is mounted the weed-hook $w$, said hook consisting of a steel bar whose front end is bent transversely, as shown at $w'$, and pivoted in holes in the sides of the extension $u$ as shown; the active end of the hook extending rearwardly in a position substantially in line with the sheth $t$. The end $w'$ of the weed-hook forms a pivot for a link-connection of two bars $x$, which are pivotally connected with the lever $i$ by a pin $x'$ near the base thereof, whereby, when said lever is turned backwardly into the dotted-line position, the extension $u$ is forcibly turned up with respect to the frame $a$, but as the pole $v$ attached thereto overbalances the frame $a$, the turning down of the lever $i$ has the effect of tilting the frame about the shaft $b$ until the share $s$ and digger-forks $p$ are raised from the ground, and at the same time the latter are disconnected from the shaft by the action of the bell-crank lever $j$ in the manner already described. At the same time the weed-hook $w$ is raised from the ground by means of a chain or like connection $w^2$ between the shank of said hook and the link $x$, which chain also limits the downward motion of the hook and prevents it from plowing into the ground.

The lever $i$ will of course remain up during operation of the machine in digging potatoes, but at other times it is turned down into the dotted line position and is held in this position by a hooked strap $y$ mounted on the side of the frame. A looped bar $z$ is mounted on the bracket $r'$ for the purpose of holding the reins while driving.

As used in practice the gears and clutch-mechanism are inclosed in a casing of which bottom-plate $a^2$, depressed at $a^6$ to admit the gear $f$, forms one part and the other half is removed in the drawing (not being an essential part of the invention) to show the inclosed parts. A tool-tray is shown at $a^8$.

Various changes and modifications in the constructions as herein shown may be made without departing from the spirit of my invention, and I wish it understood therefore that the latter is not otherwise limited than by the reasonable scope of my claims.

Having thus described my invention, what I claim as new and desire to secure by Letters Patent is:

1. In a device of the class described, the combination of a plurality of digging-tools arranged at different points of a cycle of movement, means for carrying said digging-tools following one another around said cycle, a plurality of guiding-sticks one attached to each tool, and guiding-means for said sticks at a distance to one side of said cycle of movement.

2. In a device of the class described, the combination of a plurality of digging-tools arranged at different points of the cycle of movement, means for carrying said digging-tools following one another around said cycle, a plurality of guiding-sticks one attached to each tool, and a guiding-ring at a distance to one side of said cycle through which all of said sticks pass.

3. In a device of the class described, the combination of a wheel, a plurality of digging-tools pivotally mounted on one face thereof, a plurality of guiding-sticks connected to the respective tools, and guiding-means for said sticks at one side of said wheel.

4. In a device of the class described, the combination of a wheel, a plurality of digging-tools pivotally mounted thereon, a plurality of guiding-sticks connected to the respective tools, and a guiding-ring at one side of said wheel through which all of said sticks pass.

5. In a device of the class described, the combination of a rotating-member, a digging-tool pivotally mounted thereon, a guiding-stick connected with said member, and guiding-means mounted in a position at one side of and at a distance from the path of movement of the pivot of said tool and acting to guide said stick to pass always substantially through a fixed point.

6. In a device of the class described, the combination of a rotating-member, a digging-tool pivotally mounted thereon, a guiding-stick connected with said member, and a fixed guiding-ring through which said rod passes at a distance from and at one side of the path of movement of the pivot of said member.

7. In a device of the class described, the combination of a wheel, a plurality of digging-tools pivotally mounted on said wheel in the same circle of movement, a plurality of guiding-sticks pivotally connected with the several tools, and a guiding-ring at one side of the path of rotation of said tools and also to one side of the plane of such rotation and through which all of said sticks pass.

8. In a device of the class described, the combination of a rotating-member, a digging-tool pivotally mounted thereon, a guiding-stick connected with said member, and a guide for said stick at one side of its cycle of movement causing said stick to pass always substantially through the same point.

9. A device of the class described comprising, in combination, a frame adapted to move longitudinally, a wheel carried by said frame and rotating in a plane transverse to the motion thereof, means for rotating said wheel, a digging-tool pivotally mounted on said wheel at a distance from the axis, a stick connected with said digging-tool in a manner preventing relative movement in the plane of rotation of the wheel, said stick projecting upwardly, and a fixed guide for said stick at a distance above said wheel which causes said stick to pass always through a given point.

10. A device of the class described comprising a frame adapted to be moved longitudinally, a longitudinal axle, means carried by said frame for rotating said axle, a pivot parallel to and at a distance from said axle and rotated by and around it, a digging-tool pivotally mounted on said pivot and adapted in the lower part of its cycle of movement to enter, pass transversely through and emerge from the earth, a stick attached to said tool, and a guiding ring through which said stick passes at a distance above the path of movement of said pivot whereby said digging-tool is maintained substantially upright throughout its cycle of rotation.

11. A device of the class described comprising, in combination, a frame adapted to be moved longitudinally, a wheel carried by said frame in a transverse plane, means for rotating said wheel, a plurality of digging-tools pivotally mounted on the circumference of said wheel, a plurality of sticks attached to the respective digging-tools in a manner to prevent relative rotation in the plane of rotation of the wheel, said sticks projecting upwardly, and means for guiding the upper ends of said sticks.

12. A device of the class described comprising, in combination, a frame adapted to be moved longitudinally, a wheel carried by said frame in a transverse plane, means for rotating said wheel, a plurality of digging-tools pivotally mounted on the circumference of said wheel, a plurality of sticks each pivotally connected to one of said digging-tools about an axis at right angles to the axis of rotation of the tool, said sticks projecting upwardly and backwardly, and a ring embracing the upper ends of said sticks guiding them whereby said digging-tools are maintained substantially upright during their rotative movement.

13. A device of the class described comprising, in combination, a frame adapted to move longitudinally, a pair of supporting and driving-wheels mounted on said frame, a longitudinal shaft at the rear of said frame, gearing adapted to drive said longitudinal shaft from said wheels, a wheel mounted on the rear end of said longitudinal shaft and rotated thereby, a plurality of digging-tools pivotally mounted on the circumference of said wheel, and adapted to enter, pass transversely through, and emerge from the ground in the lower part of their cycle of movement, a plurality of sticks hinged to the respective digging-tools about an axis lying parallel to the plane of movement of said digging-tools, said sticks projecting upwardly and backwardly, a guide-ring mounted on said frame and encircling the upper ends of said rods whereby they are guided, and a plow mounted on said frame immediately in front of said digging-tools at their lower extremity of movement and adapted to pass through and loosen the earth prior to the passage therethrough of said digging-tools.

In witness whereof, I have hereunto set my hand this 29th day of May, 1908.

FELIX LESSER.

Witnesses:
CARROLL MURTHA,
H. D. HOPKINS.